United States Patent [19]
Hill

[11] 3,794,968
[45] Feb. 26, 1974

[54] ANALYZER FOR COMPARING THE RESPONSE OF AN ORGANISM TO A REFERENCE PATTERN

[75] Inventor: Lyle M. Hill, Portsmouth, R.I.

[73] Assignee: Raytheon Company, Lexington, Mass.

[22] Filed: Sept. 11, 1972

[21] Appl. No.: 287,960

[52] U.S. Cl. ............................... 340/52 R, 340/279
[51] Int. Cl. ............................................ G08b 21/00
[58] Field of Search..... 340/63, 64, 52 R, 52 F, 279

[56] References Cited
UNITED STATES PATENTS

| | | | |
|---|---|---|---|
| 3,559,205 | 1/1971 | Colby | 340/52 R |
| 3,594,772 | 7/1971 | Setser | 340/52 R |
| 3,611,344 | 10/1971 | Couper | 340/279 |
| 2,625,594 | 1/1953 | Mathis | 340/279 |

Primary Examiner—Alvin H. Waring
Attorney, Agent, or Firm—Joseph D. Pannone; David M. Warren; Milton D. Bartlett

[57] ABSTRACT

A system for testing the reaction of a human subject to a test stimulus for ascertaining the fitness of the human subject for performing a specific task, in particular, the driving of an automobile under the influence of alcohol. The test utilized in the preferred embodiment of the invention requires a human subject to monitor the magnitude of a quantity (such as the length of a line) which changes at a nonuniform predictable rate utilizing information provided by minimal cues, in particular, a pair of flashing lights which indicate whether the rate of change is being overestimated or underestimated. Circuitry for building a test device, as well as interlocking such a device with the ignition system of an automobile, are also disclosed.

29 Claims, 6 Drawing Figures

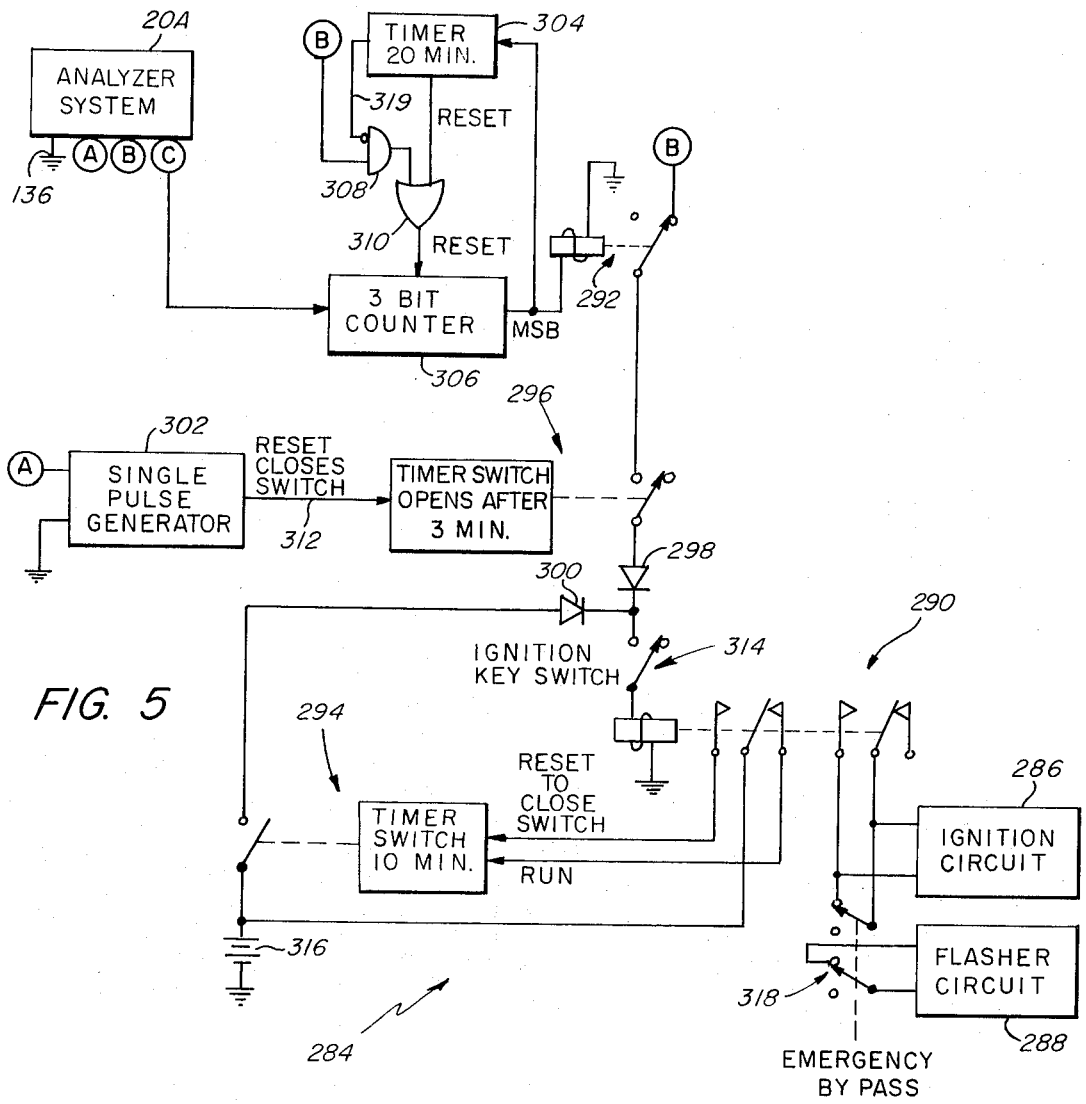

ANALYZER FOR COMPARING THE RESPONSE OF AN ORGANISM TO A REFERENCE PATTERN

BACKGROUND OF THE INVENTION

This invention relates to systems for testing the human response to a specific test situation for determining the fitness of a person for performing a related task. In particular, a test situation related to the driving of an automobile is provided for predicting the fitness of a human subject under the influence of alcohol for driving an automobile.

Drunkenness by persons in public places has presented a much publicized hazard to the general public, particularly in those situations wherein a person having diminished capabilities due to excessive quantities of alcohol in his blood attempts to drive an automobile. Indeed, drunken driving is a primary cause of death on the highways. In addition to alcohol, other factors such as drugs, sickness, or excessive fatigue may result in impaired fitness for performing specific tasks such as the operation of industrial machinery and automobiles, in which cases harm may result to the person himself as well as to other people.

While it has long been recognized that the aforesaid harm may be avoided by requiring people to desist from the operation of machinery while they are in a state of diminished capability, the problem has been ever present that there is no convenient and accurate means for determining how well such persons can operate the machinery or perform other tasks related thereto.

With reference to a related matter, it is noted that the response of a person in a testing procedure may be beneficial in teaching himself to improve, this being a particular problem situation arising in therapy from serious illness such as a stroke causing partial paralysis of a part of the body.

SUMMARY OF THE INVENTION

The aforementioned problems are overcome and other advantages are provided by a system, in accordance with the invention, which provides for a device that may be manipulated by a human subject, such as the turning of a knob, and an indicator for eliciting a sensory perception by the person for warning the person how well he is performing. There is also provided a comparator, preferably in the form of an electrical circuit, which compares the pattern of the subject's response to a reference pattern and, in accordance with the comparison, energizes the warning indicator. In a preferred embodiment of the invention, two light sources serving as the indicator are utilized with a knob, one light source glowing brightly when the knob is turned too slowly, the other light source glowing brightly when the knob is turned too rapidly, with both light sources glowing dimly when the knob is turned at a proper rate. The reference pattern, in the preferred embodiment, is provided by a predetermined turn rate program with respect to the turning of the knob, unknown to the person being tested, which must be followed closely to pass the test. Such a turn rate program is conveniently provided by an electrical circuit comprising a resistor and capacitor wherein the transient response of the circuit represents the pattern of values for either the knob position or the rate of turn of the knob. To implement the aforesaid relationship of the circuit transient response to the rate of turning of the knob, a transformation (in a mathematical sense) of the subject's response is provided by an integrator circuit, in one embodiment of the invention, which is coupled between the knob and the comparator. Other patterns may be utilized such as a sinusoidal pattern which is readily provided by an oscillatory electrical circuit. The changing magnitude of the electrical signal of the aforesaid transient response bears an apparent similarity to the radius of curvature of a roadway wherein a driver would be required to turn at an ever increasing rate and then to straighten out at a decreasing rate of turning until the turn in the roadway is completed.

The testing as provided by the preferred embodiment of the invention has shown an excellent correlation between the performance of a human subject under test and his performance in actually driving an automobile while under the influence of alcohol. Means are also disclosed for connecting the electrical circuitry of the test device with the ignition system of a vehicle such as an automobile or an aircraft to prevent use of such vehicle until the operator is suitably fit to operate the vehicle. Other sensors and tasks may be utilized such as the tracking of a musical tone in response to other tones which indicate how the tracked tone is to vary. Tactile stimulation may be utilized wherein a force applied to one limb of a person indicates how a second limb is to respond.

BRIEF DESCRIPTION OF THE DRAWINGS

The aforementioned objects and other features of the invention are explained in the following description taken in connection with the accompanying drawings wherein:

FIG. 5 is a diagram of a vehicular interlock system including the reaction analyzer system of FIG. 3; and FIG. 6 is a diagram of an alternative embodiment of a response signal generator of FIG. 3 showing a rate control.

DESCRIPTION OF THE PREFERRED EMBODIMENT

Figure 1:
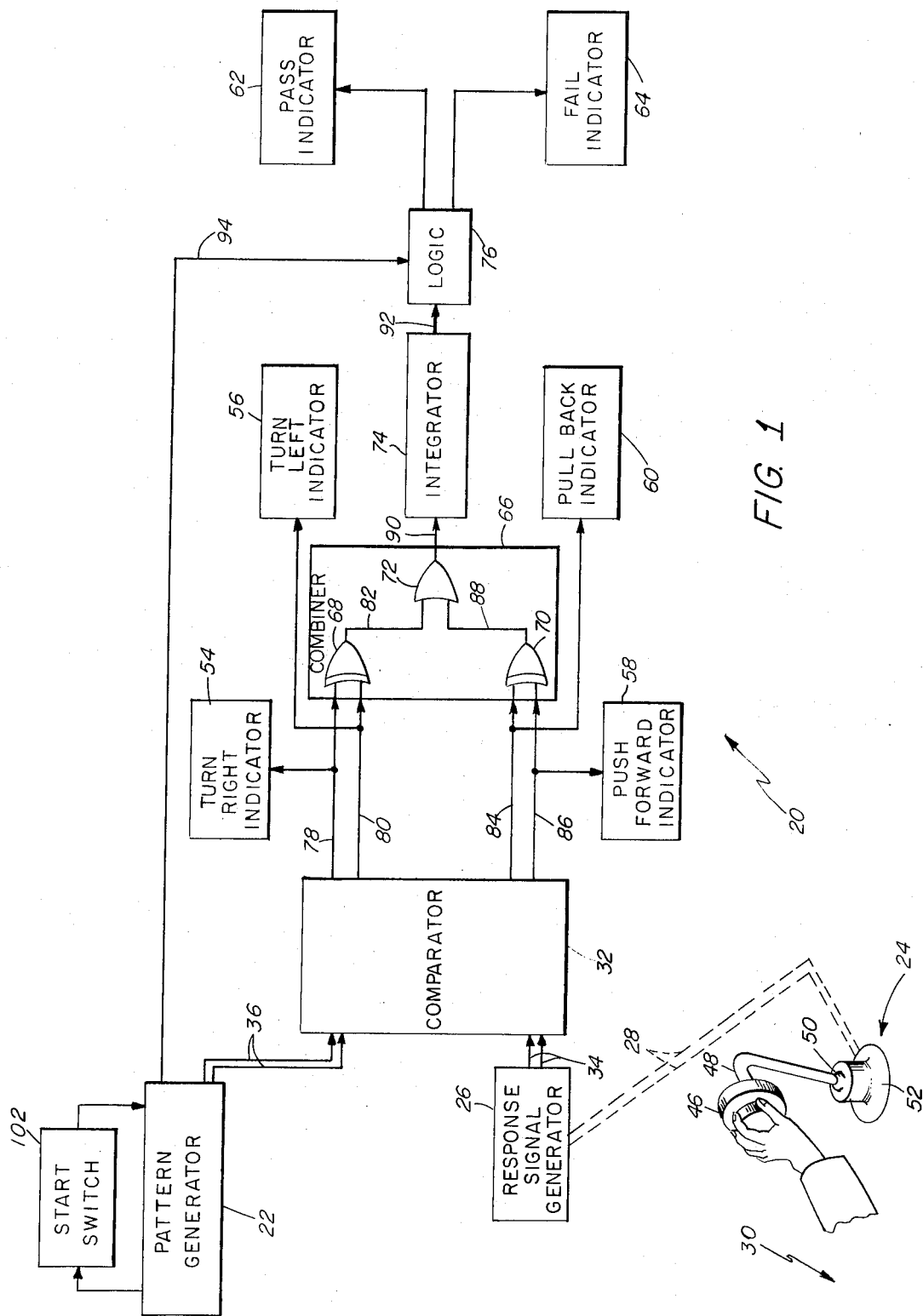
FIG. 1 is a block diagram of a reaction analyzer system in accordance with the invention.
Figure 2:
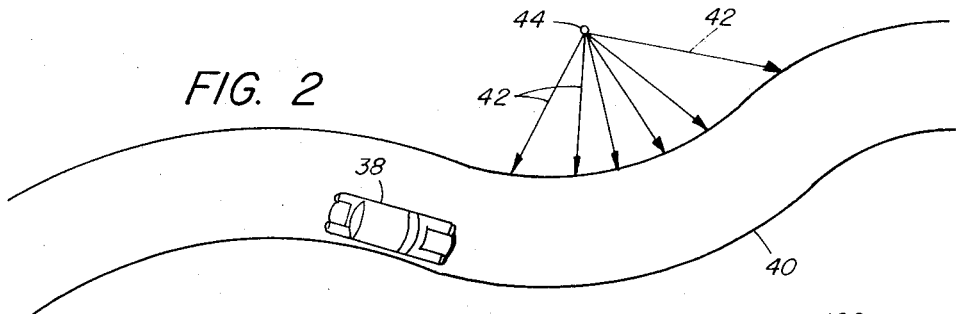
FIG. 2 is a pictorial representation of a roadway useful in showing an analogy between a changing radius of curvature and a pattern utilized in the reaction analyzer of FIG. 1.

Referring now to FIGS. 1 and 2 there are seen respectively a block diagram of a reaction analyzer in accordance with the invention and a pictorial representation of a roadway useful in explaining the relationship between the operation of the invention and the response of a person driving an automobile along a roadway. The reaction analysis is provided by a system 20 comprising a pattern generator 22, a handle 24, a generator 26 coupled to the handle 24 by lines 28 for generating signals representing the response of a person 30 being tested, and a comparator 32 for comparing signals on lines 34 from the generator 26 with signals on lines 36 from the pattern generator 22. With reference to FIG. 2, an automobile 38 is being driven along a roadway 40 having a varying radius of curvature as is indicated by each of the radii 42 drawn from a common point 44 to an edge of the roadway 40. It is apparent that as the automobile 38 approaches a curve in the roadway 40, the automobile 38 must negotiate a path of decreasing radius of curvature until a minimum radius of curvature is reached, after which the radius of curvature steadily increases as the automobile 38 approaches a straighter portion of the roadway 40. In a similar manner, the signal on line 36 has, in a preferred embodiment of the invention, a waveform which becomes successively more positive during a first interval of time whereupon the waveform is altered in the opposite sense to become successively more negative during a second interval of time.

For purposes of analyzing the capabilities of the person 30 for driving the automobile 38 along the roadway 40, an adequate simulation of the driving conditions is implemented by generating the waveform of the signal on line 36 from a succession of transient responses of a resistor-capacitor (R-C) circuit such that the waveform increases at an exponentially decreasing rate in a first direction and, thereafter, decreases at an exponentially decreasing rate in the opposite direction.

For thorough testing of the person 30, it may be desirable to utilize a more complex test situation in which responses of the person 30 are to be provided in a plurality of coordinates, the handle 24 providing two such coordinates, one of which is a rotation of a knob 46 and the second being the pushing and pulling of a shaft 48 which supports the knob 46 and is pivoted about pivot 50 to a base 52 of the handle 24. Potentiometers, not shown, may be built into the handle 24 such that one potentiometer connected between the knob 46 and the shaft 48 provides an electrical signal indicating an angle of rotation of the knob 46 while a second potentiometer connected to the pivot 50 provides an electrical signal representing an angle of pivot of the shaft 48 relative to the base 52. These two signals are communicated via the lines 28 to the generator 26 which, in turn, converts these signals either by a linear scaling or via a nonlinear relationship such as that of a sine or cosine function to appear as the signals on the respective lines 34. In a two coordinate system, the pattern generator 22 generates a pair of signals on the lines 36, each of which is compared to the corresponding signal on the lines 34 by the comparator 32.

The system 20 further comprises six indicators, namely, a turn right indicator 54, a turn left indicator 56, a push forward indicator 58, a pull back indicator 60, a pass indicator 62, and a fail indicator 64, a combiner 66 comprising three components, namely, an exclusive OR gate 68, an exclusive OR gate 70 and an OR gate 72, an integrator 74 for summing together successive outputs from the combiner 66, and a logic unit 76 which in response to the output of the integrator 74 energizes the pass and fail indicators 62 and 64. The turn right and turn left indicators 54 and 56 show the person 30 how well he is turning the knob 46 while the push forward and pull back indicators 58 and 60 show the person how well he is pivoting the shaft 48. For analysis based on a testing of the person 30 in a single coordinate, such as by means of a turning of the knob 46, only the turn right and turn left indicators 54 and 56 are utilized.

The comparator 32 operates in the following manner for accomplishing an analysis in only one dimension. When the signal on line 36 is greater than the signal on line 34, a high voltage appears on line 78 and a low voltage on line 80, this energizing the turn right indicator 54 and de-energizing the turn left indicator 56. The turn right and the turn left indicators 54 and 56 may be visual indicators such as lighted lamps, aural indicators such as a high-pitched tone for turn right and a low pitched-tone for turn left, or tactile indicators such as a device (not shown) which applies pressure to the foot of the person 30 or pinches his skin. In the event that the signal on a line 36 approximately equals the signal on the corresponding line 34, then the signals on lines 78 and 80 may have equally high values of voltage or equally low values of voltage to indicate a good response by the person 30, the two indicators 54 and 56 being energized in the former situation while in the latter situation both indicators would be de-energized. With either the former or latter situation, the exclusive OR gate 68 would provide a signal on line 82 having a logic state of 1 only when the response of the person 30 is in error, this corresponding to an inequality of the signals on the lines 34 and 36, the exclusive OR gate 68 providing a signal on line 82 having a logic state of 1 during a good response of the person 30, this being an approximate equality of the signals on the lines 34 and 36.

For the two coordinate situation, the comparator 32 operates in a similar manner with a second pair of signals on the lines 34 and 36 for operating the indicators 58 and 60. Thus, in accordance with a signal having a logic value of 1 on either line 84 or line 86, the exclusive OR gate 70 provides a signal on line 88 having a logic value of 1. The OR circuit 72 provides a signal having a logic state of 1 on line 90 in response to logic 1 signals on either line 82 or line 88 or on both of these lines. Thus, the logic 1 signal on line 90 indicates a failure of the person 30 to properly turn the knob 46 or pivot the shaft 48, or a combination of these failures throughout the interval of time during which the logic 1 state persists on the line 90. Alternatively, the OR gate 72 may be replaced with a summing amplifier (not shown) such that the voltage on the line 90 is doubled when a failure of response by the person 30 is simultaneously present on both of the coordinates, namely, the turning of the knob 46 and the pivoting of the shaft 48.

The integrator 74 provides a signal on line 92 which is the integral of the waveform of the signal appearing on line 90. Thus, if a logic state of 1 is present on line 90 for an extended period of time, the signal on line 92 builds up rapidly, while if the logic state of 1 is present infrequently or for only short periods of time, then the signal on line 92 rises at a relatively low average rate. Thus, the value of the signal on line 92 is a measure of the error experienced by the person 30 in trying to track the pattern of the signal or signals on the lines 36. Alternatively, the OR gate 72 may be replaced with an OR gate (not shown) in which case the signal on line 92 will represent the amount of success experienced by the person 30 in tracking the signal or signals on line 36. The logic unit 76 energizes the pass indicator 62 in response to a signal on line 94 which signal indicates the termination of the test pattern provided by the pattern generator 22. However, if the magnitude of the signal on line 92 indicates an excessive amount of errors on the part of the person 30, then the logic unit 76 gates out the signal on line 94 and energizes the fail indicator 64.

It is apparent from the comparison of the FIGS. 1 and 2, that in the real-life situation of FIG. 2, a driver of the automobile 38 is presented with a view of the roadway 40 as it actually appears, while the person 30 of FIG. 1 knows nothing about the highway or the analogous test pattern of the pattern generator 22 than that provided by the indicators 54, 56, 58 and 60. Assuming that lighted lamps are used for these indicators, the person 30 would only see the lighting of a lamp and the extinguishing of another lamp in response to his turning of the knob 46 and his pushing of the shaft 48. Thus, the system 20 requires a significant amount of concentration by the person 30 and a significant amount of memory of his prior experience in attempting to feel out the nature of the curve traced by each portion of the waveforms of the signals on the lines 36. It is the coordination of his powers of concentration with his motor skills in manipulating the handle 24 that serve to test his reaction to the test pattern of the pattern generator 22 under the influence of various debilitating factors such as intoxication, drug addiction, sickness or fatigue.

Figure 3:
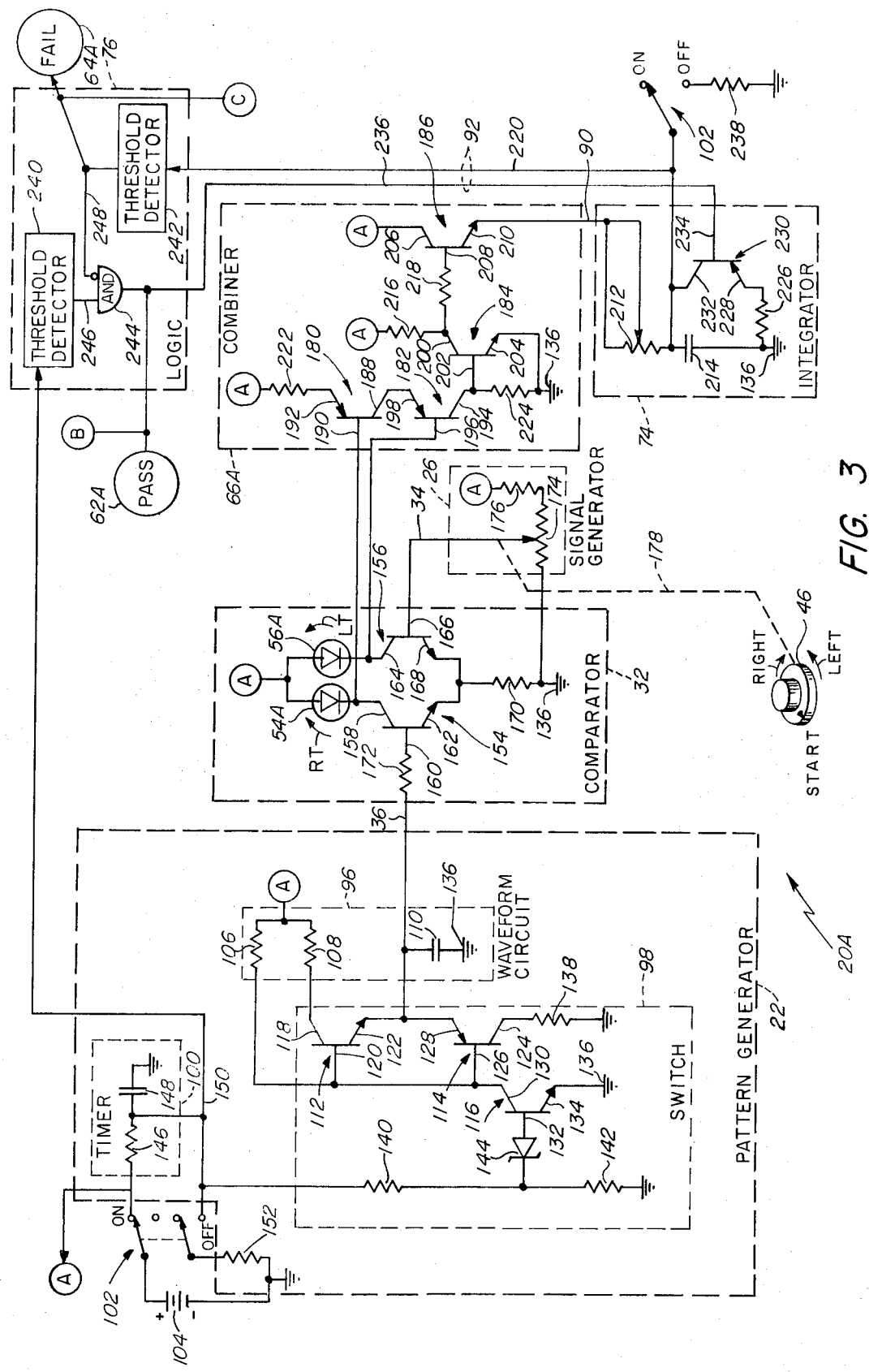
FIG. 3, partially in schematic form and partially in block diagrammatic form, shows electrical circuitry utilized in a preferred embodiment of the invention according to FIG. 1.

Referring now to FIG. 2, there is shown a system 20A which is an implementation of the system 20 of FIG. 1 for a single coordinate in which only the knob 46 is to be manipulated by the person 30. FIG. 3 shows the logic unit 76 in block diagram form while the pattern generator 22, the comparator 32, the generator 26 and the integrator 74 are shown via electrical schematic diagrams. In lieu of the combiner 66 of FIG. 1, there is provided in FIG. 3 a combiner 66A which functions in a manner analogous to the combiner 66 of FIG. 1 but has a somewhat simplified electrical circuit.

The pattern generator 22 of FIG. 3 is seen comprising a waveform circuit 96, a switch circuit 98 and a timer 100, the timer 100 being connected by an external start switch 102, seen also in FIG. 1, which serves the dual functions of starting the timer 100 and the pattern generator 22 as well as providing power from a battery 104 to the system 20A. The waveform circuit 96 comprises two resistors 106 and 108 and a capacitor 110. The switch circuit 98 comprises three transistors 112, 114, and 116, the transistor 116 having a collector electrode 118, a base electrode 120 and an emitter electrode 122, the transistor 114 having a collector electrode 124, a base electrode 126 and an emitter electrode 128, and the transistor 116 having a collector electode 130, a base electrode 132 and an emitter electrode 134. The transistors 112 and 116 are of the NPN-type while the transistor 114 is of the PNP-type. The capacitor 110 is connected between ground 136 and a junction of the two emitter electrodes 122 and 128. The base and collector electrodes of the transistor 112 are coupled respectively via resistors 106 and 108 to a terminal designated by the letter A, the terminal A being coupled to the positive terminal of the battery 104 during operation of the system 20A via the start switch 102. The base electrodes 120 and 126 are connected together and to the collector electrode 130. The emitter terminal 134 of the transistor 116 is connected to ground 136 while the collector 124 of the transistor 114 is coupled to ground 136 via a resistor 138. A bias voltage for the base electrode 132 of the transistor 116 is provided by resistors 140 and 142 which are joined together at the cathode electrode of a zener diode 144, the anode electrode of the zener diode 144 being connected to the base electrode 132 of the transistor 116.

The timer 100 comprises a resistor 146 and a capacitor 148 which are serially connected between the terminal A and ground 136. When the terminal A is coupled via the start switch 102 to the battery 104, current flows by the resistor 146 into the capacitor 148 with the result that the voltage across the capacitor 148 builds up in accordance with the well-known R-C transient response. Line 150, which connects with the junction of the resistor 146 and capacitor 148, provides a timing voltage.

In operation, the pattern generator 22 provides a signal voltage on line 36 which is to be tracked by the person 30 of FIG. 1, the signal voltage on line 36 having the form of, in the preferred embodiment of the invention, an R-C circuit transient response in which the voltage is increasing followed by such a transient response in which the voltage is decreasing. The first transient begins when the start switch 102 is operated to energize the timer 100, and the second transient begins when the timing signal voltage on line 150 reaches a predetermined value. During the first of these two transients, the zener diode 144 is in a state of nonconduction due to the low value of voltage present on the line 150. Thus, the transistor 116 is nonconducting with the result that the transistor 112 conducts current via resistor 108 into the capacitor 110 thereby charging the capacitor 110 at a rate related to the value of the resistor 108. When the value of the voltage on the line 150 reaches the aforesaid predetermined value, the zener diode 144 begins to conduct base current into the transistor 116 with the result that current now flows via the resistor 106 through the transistor 116 thereby reducing the magnitude of the voltage at the collector electrode 130. Accordingly, the transistor 114, which was previously in a sate of nonconduction, is now placed in a state of conduction and conducts current from the capacitor 110 through the resistor 138 thereby discharging the capacitor 110 at a rate related to the value of the resistor 138. The discharging of the capacitor 110 continues until the switch 102 is returned to the OFF condition. In the OFF condition, the start switch 102 discharges the capacitor 148 of the timer 100 via a resistor 152 so that the timer 100 is now ready for the next test of the responses of the person 30 of FIG. 1.

The comparator 32 comprises two transistors 154 and 156, the transistor 154 comprising a collector electrode 158, a base electrode 160 and an emitter electrode 162, and the transistor 156 comprising a collector electrode 164, a base electrode 166 and an emitter electrode 168. The emitter electrodes 162 and 168 are connected together and coupled to ground 136 via a resistor 170. The two transistors 154 and 156 form a differential circuit in which the conduction of current in one of the two transistors raises the voltage drop across the resistor 170 thereby tending to diminish the amount of current in the other transistor. A light-emitting diode is placed in the collector circuit of each of the transistors 154 and 156. The light-emitting diode connecting with the transistor 154 serves as the right turn indicator 54 of FIG. 1 and will be referred to as diode 54A with reference to FIGS. 3, while the light-emitting diode connected to the transistor 156 serves as the turn left indicator 56 of FIG. 1 and will be referred to as diode 56A with reference to FIG. 3. Current flows from the terminal A through the diodes 54A and 56A and the transistors 154 and 156 into the resistor 170 and then to ground 136. The current in the transistor 154 is controlled via base current applied to the base terminal 160 via a resistor 172 which is connected to the line 36.

Current flow in the transistor 156 is controlled via a voltage provided to the base terminal 166 by the generator 26 which has a potentiometer 174 coupled to terminal A via a resistor 176. The potentiometer 174 is mechanically coupled via line 178 to the knob 46 so that a turning of the knob 46 by the person 30 of FIG. 1 positions the tap on the potentiometer 174 thereby adjusting the voltage applied to the base terminal 166. When the person 30 is very accurately tracking the signal voltage on line 36, the current in the two transistors 154 and 156 are substantially equal so that equal current flows through the two diodes 54A and 56A with the result that these two diodes glow with substantially equal intensity, such intensity being moderately bright, moderately dim, or virtually non-existant, depending upon the magnitude of the resistor 170. Accordingly, a condition of good tracking may be represented in the system 20A by equal intensity or the cessation of any glowing by selecting the requisite current flow in these diodes 54A and 56A by a suitable choice of value of resistance for the resistor 170.

In the event that the person 30 in FIG. 1 has not turned the knob 46 a sufficient amount to the right, then the voltage provided by the potentiometer 174 is lower than the voltage at the base electrode 160 of the transistor 154 with the result that more current flows through the diode 54A than the diode 56A, hence, the diode 54A glows brightly while the diode 56A is extinguished thereby providing the desired indication showing that the knob 46 is to be turned more to the right. In the event that the person 30 has turned the knob 46 too far to the right, the voltage provided by the potentiometer 174 is raised a value higher than the voltage appearing at the base electrode 160 and the diode 56A glows brightly while the diode 54A is extinguished, this indicating that the person 30 should turn the knob 46 towards the left.

The combiner 66A comprises four transistors 180, 182, 184 and 186, a transistor 180 comprising a collector electrode 188, a base electrode 190 and an emitter electrode 192, the transistor 182 comprising a collector electrode 194, a base electrode 196 and an emitter electrode 198, the transistor 184 comprising a collector electrode 200, a base electrode 202 and an emitter electrode 204, and the transistor 186 comprising a collector electrode 206, a base electrode 208 and an emitter electrode 210. The transistors 180 and 182 are type PNP and the transistors 184 and 186 are type NPN. The transistor 186 is coupled via its emitter electrode 210 to the integrator 74 such that current flowing through the transistor 186 also flows through a potentiometer 212 and a capacitor 214 which form a part of the integrator 74. The capacitor 214 builds up an electrical charge which is equal to the integral of the current flowing therethrough and thus serves as the electrical element which performs the integration for the integrator 74. The collector terminal 200 of the transistor 184 is coupled via a resistor 216 to the terminal A and via a second resistor 218 to the base electrode 208 of the transistor 186. Thereby, a signal appearing at the base electrode 202 of the transistor 184 is amplified, with the amplified signal appearing at the collector electrode 200 and coupled via the resistor 218 to the base electrode 208. The transistor 186 applies a current to the capacitor 214 proportional to the signal at the base terminal 208 and thereby provides a signal on line 220 which is the integral of the signal appearing at the base electrode 202.

The transistor 180 is connected via its emitter terminal to a resistor 222 which provides a flow of current from the terminal A to the transistor 180. The transistor 180 is in turn connected via its collector terminal to the emitter terminal of the transistor 182 which, in turn, is connected via its collector terminal 194 to a resistor 224, the resistor 224 being connected to ground 136. The base electrode 190 of the transistor 180 is directly connected to the collector electrode 158 of the transistor 154, and the base electrode 196 of the transistor 182 is directly connected to the collector electrode 164 of the transistor 156.

In operation, the signals which energize the diodes 54A and 56A of the comparator 32 also energize the transistors 180 and 182 of the combiner 66A. When the voltage at the collector electrode 158 rises, this corresponding to a condition of diminished current in the diode 54A and diminished illuminance thereof, the voltage across the base-emitter junction of the transistor 180 is reduced providing for diminished current through the transistor 180. Similar comments apply to the relationship between the illuminance of the diode 56A and the transistor 182. The values of resistance of resistors 222 and 224 are selected such that when the values of voltage applied to the base electrodes 190 and 196 are substantially equal, a maximum current flows through the transistors 180 and 182 providing a maximum voltage drop across the resistor 224. When the diode 54A is glowing and the diode 56A is extinguished, the voltage applied to the base electrode 190 is lower than the voltage applied to the base electrode 196 with the result that current entering the transistor 180 at the emitter electrode 192 flows through the base electrode 190 while the collector electrode 188 appears to be open circuited, there being no current flowing through the transistor 182 since the base-emitter junction thereof is back biased. Thus, no current enters the resistor 224 from the collector electrode 194 with the result that a minimum voltage drop appears across the resistor 224. Similarly, when the diode 56A is glowing and the diode 54A is extinguished, and, accordingly, a minimal current flows through the transistor 180 while a maximum voltage drop appears between its collector and emitter electrodes, the voltage drop across the resistor 224 is again at a relatively low value. A low voltage drop across the resistor 224 results in a relatively high value of voltage appearing at the collector electrode 200 while a relatively large voltage drop across the resistor 224 results in a minimum value of voltage appearing at the collector electrode 200. Thus, during periods of time when either one of the diodes 54A or 56A are illuminated, but not when both of these diodes are illuminated, the transistor 186 applies a relatively large current to the integrator 74 with a result that the capacitor 214 is being charged.

The total charge accumulated by the capacitor 214 is related to the amount of time that only one of the diodes 54A or 56A is flowing or, correspondingly, the amount of time that the person 30 of FIG. 1 is in error in his attempt to track the voltage waveform appearing on line 36. The potentiometer 212 is wired so that its tap is connected to one terminal thereof so that if functions as a variable resistor, the position of the tap controlling the rate at which the capacitor 214 is charged in response to the voltage appearing at the collector 200 of the transistor 184. The potentiometer 212 has been labeled a "difficulty control" in FIG. 3 since a rapid rate of charge will energize the fail indicator 64 of FIG. 1 even with minimal errors in the part of the person 30 while a low rate of charge results in an energization of the fail indicator 64 only in the event of an extensive interval of failure on the part of the person 30.

The integrator 74 further comprises a resistor 226 connected between ground 136 and emitter electrode 228 of a transistor 230, the collector electrode 232 thereof being connected to the line 220 while the base electrode 234 thereof is connected to the logic unit 76 along line 236 in a manner to be described, the lines 236 and 220 being included within the line 92 shown in FIG. 1. In response to a signal on line 236, the transistor 230 is made to conduct current through the capacitor 214 thereby discharging the capacitor. In the absence of the signal on line 236, the capacitor 214 retains its charge. A section of the start switch 102 is serially connected with a resistor 238 between the line 220 and ground 136 for discharging the capacitor 214 when the system 20A is turned off at the completion of a test.

The logic unit 76 comprises two threshold detectors 240 and 242 and an AND gate 244. The threshold detector 240 is responsive to the signal on line 150 and has an output on line 246 connected to the AND gate 244. The threshold detector 242 is responsive to the signal on line 220 and has an output on line 248 which is connected to a complemented input of the AND gate 244. The pass indicator 62 of FIG. 1 is provided for in FIG. 3 by a lamp 62A which may be a light-emitting diode, and the fail indicator 64 of FIG. 1 is provided for in FIG. 3 by a lamp 64A. The threshold detectors 240 and 242 may utilize circuitry such as a well-known comparator circuit or a Schmitt trigger-type circuit wherein the output signals on the lines 246 and 248 are either of a high voltage or a low voltage depending on whether the voltages on the lines 150 and 220 are, respectively, above or below a predetermined value of threhold. The threshold detector 240 provides the high value of voltage corresponding to a logic state of 1 on the line 246 when the timing signal on line 150 has reached a value indicating that the test interval is completed, and the threshold detector 242 provides the high voltage corresponding to a logic state of 1 on the line 248 when the voltage on line 220 has risen to a value corresponding to a failure on the part of the person 30 of FIG. 1. When the person 30 is performing the test satisfactorily, a low voltage or logic state of 0 appears on the line 248 so that upon the first appearance of a logic state of 1 on line 246, the AND gate 244 provides a high voltage or logic state of 1 on line 236 which energizes the lamp 62A and energizes the transistor 230 to discharge the capacitor 214 thereby insuring that the voltage on the line 220 will not rise to a value indicating a failure; thus, if the pass lamp 62A is illuminated, a logic state of 1 will not appear on line 248 for illuminating the fail lamp 64A. In the event that the person 30 performs with excessive errors such that the voltage on line 220 rises to a sufficient value to trigger the threshold detector 242, the logic state of 1 appears on the line 248 and energizes the fail lamp 64A while inhibiting the AND gate 244 such that the logic state of 1 appearing on line 246 at the termination of the testing interval is not communicated tot e line 236, thereby insuring that the pass lamp 62A remains extinguished.

Figure 4:
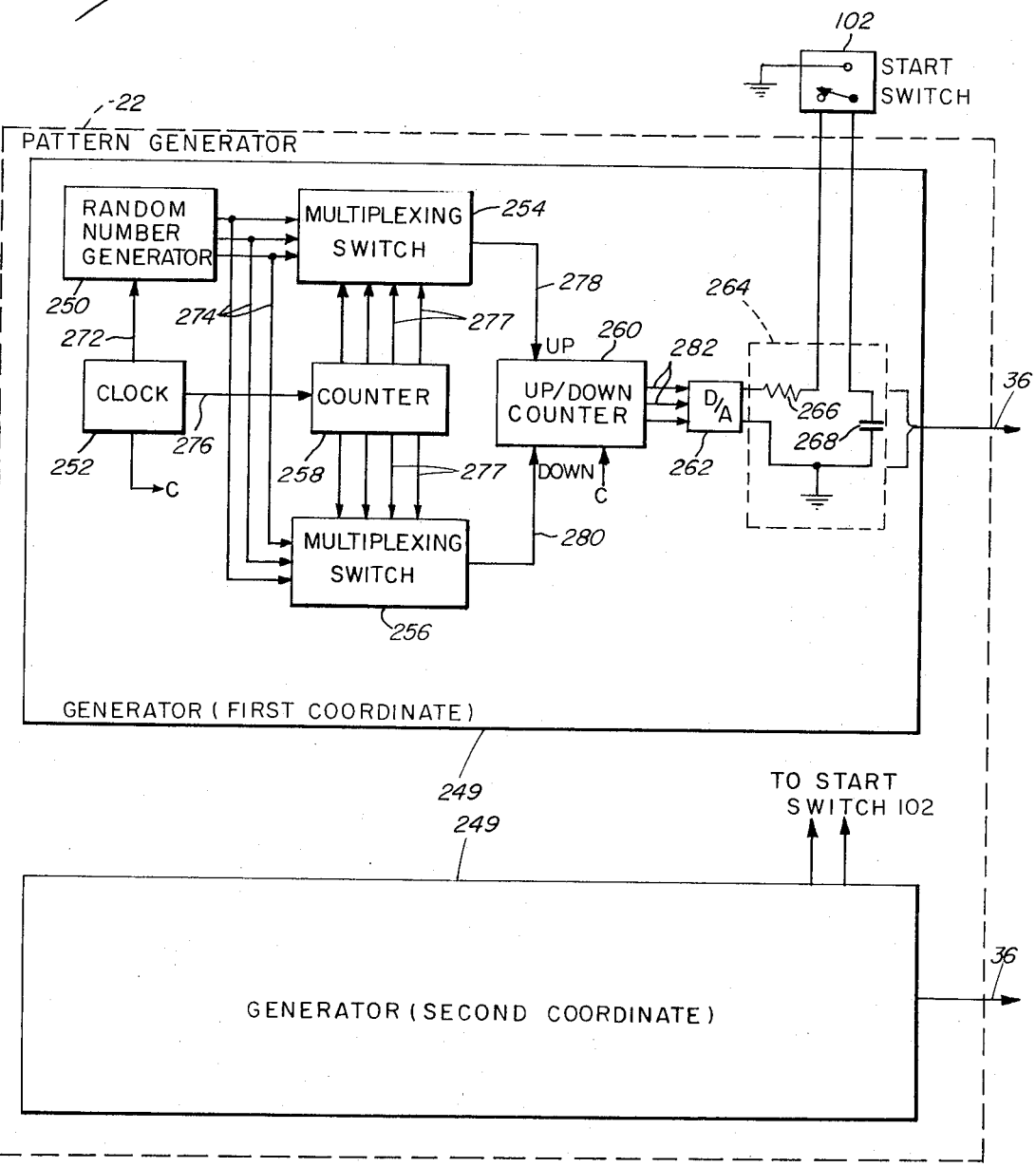
FIG. 4 is a block diagram of an alternative form of pattern generator utilized in FIG. 1.

Referring now to FIG. 4, there is seen an alternative embodiment of the pattern generator 22 of FIG. 1, here shown having two sections, each comprising a generator 249, one for each coordinate. Each generator 249 comprises a generator 250 of random numbers, a clock 252, two multiplexing switches 254 and 256, a counter 258, and UP/DOWN counter 260, a digital-to-analog converter to be referred to hereinafter as D/A 262, and a circuit 264 comprising a resistor 266 and a capacitor 268 which function in a manner analogous to the resistor 108 and capacitor 110 of FIG. 3 in providing an R-C transient response waveform. Both generators 270 are seen coupled to the start switch 102 in a manner conforming to that of FIG. 1, and each is provided with an output along a line 36 as is seen also in FIG. 1.

The operator of each of the generators 249 is the same so that only one of them need be described. The generator 250, of random numbers, is driven by clock signals on line 272 provided by the clock 252, and in response thereto, provides multibit numbers on lines 274 to the multiplexing switches 254 and 256. The clock 252 also provides clock signals to the counter 258 via line 256 as well as to the UP/DOWN counter 260 as is shown in the figure by terminal C. A set of lines 277 connects from the various cells or stages of the counter 258 to provide square wave signals of differing pulse repetition frequencies, the frequency of each such signal on one of the lines 277 being double the signal on the adjacent line 277, to the multiplexing switches 254 and 256. A binary number on the lines 274 selects a particular line 277 to be transmitted along the output lines 278 and 280 respectively of the multiplexing switches 254 and 256. Thus, square waves of differing frequencies appear at regular intervals on the lines 278 and 280, corresponding to the intervals of the clock signals on the line 272. The UP/DOWN counter 260 comprises steering logic which in response to the presence of a signal on line 278 counts UP, and in response to the presence of signals on line 280 counts DOWN, with a count being registered for each logic state of 1 appearing on the line 278 and for each logic state of 1 appearing on the line 280. The output of the UP/DOWN counter 260 appears on lines 282 and is applied to D/A 262 which converts the digital number at the output of the counter 260 to an analog voltage, the analog voltage being applied to the circuit 264. The analog voltage being applied to the circuit 264 has the form of a stair-case voltage which increases and decreases in a random fashion as provided by the random number generator 250, with the intervals of change in these steps being multiples of the intervals of the clock pulses on the line 272. The signals provided by the clock 252 are suitably delayed from each other so that the counter 258 changes state after the generator 250 has addressed the multiplexing switches 254 and 256. The multiplexing switch 254 operates on a different set of addresses than does the multiplexing switch 256 so that only one of these switches accepts an input from a line 277 at a time. The resultant waveform appearing on line 36 in FIG. 4 is thus similar to the waveform appearing on line 36 of FIG. 3 except that, in FIG. 4, a succession of transient responses appears of which the amplitudes and directions are provided in a random manner. The pattern generator 22 of FIG. 4 provides a more complex testing pattern than that of FIG. 3 in that the person being tested can learn to operate the system 20 but cannot learn a particular pattern since they are provided in a random manner.

The systems 20 of FIG. 1 and 20A of FIG. 3, in addition to being useful for analyzing a reaction of a human subject, may be interlocked directly with the ignition system of an automobile to prevent its use by a person who fails the test. Special consideration need be given to the building of these systems when the intended use is within an automobile due to the high values of electromagnetic noise which are generated by an automobile ignition system. In particular, it has been noted that in tests of these systems and of other devices constructed of standard digital components conducted in the vicinity of an operating automobile ignition system, the devices constructed of the standard digital components malfunctioned while the system utilizing the circuitry disclosed in FIG. 3 operated successfully in the environment of an operating automobile ignition system. It is deemed advisable to avoid the use of bistable flip-flop devices which are set to be triggered by a narrow pulse or the leading edge of a pulse since the presence of a noise pulse provided by radio frequency interference may trigger such a bistable flip-flop. In contradistinction, it is noted that no such circuitry is utilized in the embodiment of FIG. 3. Each circuit shown in FIG. 3 will maintain its output voltage only as long as its input voltage is present, and a noise pulse at the input to any one circuit can result in no more than a noise pulse at the output of that circuit. Such is the case with the threshold detectors 240 and 242 since they comprise either a directly coupled comparator circuit or Schmitt trigger-type circuit without the use of capacitive coupling. And this is also the case with the switch circuit 98, the comparator 32 and the combiner 66A each of which utilize directly coupled circuitry rather than capacitively coupled circuitry. Furthermore, these circuits are inherently resistant to the presence of interfering noise pulses; for example, the line 150 is incrementally grounded via the capacitor 148 which shorts out sudden increments in the signal such as an interfering noise pulse, and in a similar way the lines 36 and 220 are incrementally grounded respectively via capacitors 110 and 214.

Referring now to FIG. 5 there is seen an interlock system 284 for coupling the analyzer 20A of FIG. 3 to the ignition circuit 286 and to the flasher circuit 288 of an automobile or other vehicle. As seen in both FIGS. 3 and 5, the system 20A has in addition to the aforementioned ground terminal 136 and terminal A, the terminals B and C which are connected respectively to the lines 236 and 248 of FIG. 3. These terminals are utilized for connecting the system 20A to the interlock system 284 as shown in FIG. 5.

The interlock system 284 comprises two relays 290 and 292, two timer switches 294 and 296, two diodes 298 and 300, a pulse generator 302 which generates a single pulse a moment after being energized with power from terminal A, a timer 304 which has been given a running time of 20 minutes in this embodiment of the invention, a counter 306 which has a three-bit capacity in this embodiment of the invention, an AND gate 308 having one of its inputs complemented, and an OR gate 310. The interlock system 284 operates as follows. In starting an automobile, the operator of the automobile first energizes the system 20A by means of the start switch 102 of FIG. 3. The pulse generator 302 which is connected to the terminal A then transmits a pulse on line 312 which resets the timer switch 296 thereby closing its switch contacts which connects the diode 298 via the normally closed switch contacts of the relay 292 to the terminal B of the system 20A. The operator then manipulates a knob such as the knob 46 of FIG. 3 and, if he passes the test, the logic state of 1 appearing at the terminal B is transmitted via the diode 298 to a switch 314 which is operated by the ignition key. Upon seeing that he has passed the test, as indicated by the lighting of the pass lamp 62A of FIG. 3, the operator then turns the ignition key thereby closing the switch 314 with the result that the high voltage representing the logic state of 1 at the terminal B now energizes the relay 290. The energization of the relay 290 closes a pair of contacts to the ignition circuit 286 for starting and running the automobile.

In the event that the automobile were to stall, or in the event that the operator turned the motor off for a few minutes while refueling at a gasoline station, it is desirable that upon restarting the automobile, he should not be required to take the test of the analyzer system 20A. Accordingly, the energization of the relay 290 closes a pair of contacts in the circuit of the timer switch 294 which applies voltage from a suitable source such as a battery 316 to the reset terminal of the timer switch 294, thereby resetting the timer switch 294 and closing its switch contacts. The timer switch 294 remains in a reset condition until the relay 290 is de-energized at which time the contacts of the relay 290 are connected to apply the voltage from battery 316 to the RUN terminal of the timer switch 294 which causes the timer switch 294 to run down for a period of, for example, ten minutes whereupon its switch contacts open. While the switch contacts of the timer switch 294 are closed, voltage from the battery 316 is applied via the closed contacts of the timer switch 294 and the diode 300 to a terminal of the switch 214 so that the operator has an interval of 10 minutes during which time he may turn the ignition key to close the switch 314 and start his automobile without taking the test.

It is also noted that the logic state of 1 at terminal B remains at terminal B until such time as the start switch 102 of the system 20A is turned OFF. To prevent the operator from utilizing this fact to "cheat" the interlock system 284 by leaving the start switch 102 permanently in the ON position, the timer switch 296 is employed. The timer switch 296 which was reset by the pulse on line 312, begins to run for an interval of, for example, 3 minutes after which its switch contacts open thereby disconnecting the terminal B from the ignition switch 314. Thus, even if the operator fails to turn off the system 20A, the system 20A is automatically decoupled from the relay 290 three minutes after the inception of the test.

It is also apparent that there are times when it may be desirable to bypass both the interlock system 284 and the system 20A such as under emergency conditions when the operator may be too nervous to operate the system 20A. Accordingly, there is provided a switch 318 which shorts out the contacts of the relay 290 thereby completing the ignition circuit 286. The switch 318 also has a set of contacts for simultaneously completing the flasher circuit 288 which causes the automobile lights to flash thereby warning other drivers that the automobile is being operated by a person who has not taken the test. If desired, the switch 318 may be provided with further contacts for sounding an alarm whenever the automobile speed exceeds a certain value, such circuitry and its connection to a suitable sensor of speed not being shown in the figure.

A further feature of the interlock system 284 prevents the operator from starting his automobile if he has failed to pass the test in a number of successive attempts, for example, four such attempts. Each time the operator operates the system 20A and fails the test, a logic state of 1 appears at terminal C and advances the count of the counter 306 by one count. The most significant bit (MSB) of the counter 306 attains a logic state of 1 upon the occurrence of the fourth successive failure by the operator in taking the test, the MSB being applied to the relay 292 as well as to the timer 304. The MSB energizes the relay 292 thereby disconnecting the terminal B from the interlock system 284 so that even if the operator later passes a test on the system 20A, still he will be unable to start the automobile until a sufficient period of time, such as the twenty minutes provided by the timer 304, has elapsed. The output of the timer 304 on line 319 is at a logic state of 0 until such time as the timer 304 is energized by the MSB whereupon the output of the timer 304 changes to a logic state of 1. This logic state of 1 is retained while the timer runs down through the twenty minute interval whereupon the logic state of 0 is restored on line 319. In the event that the operator passes the test after one, two, or three failures, the pass signal having a logic state of 1 at terminal B is passed via the AND gate 308 and the OR gate 310 to reset the counter 306 to a value of 0 thereby ensuring that the terminal B will not be disconnected from the interlock system 284 by the relay 292. In the event that the operator fails the test for four or more attempts, in which case the counter 306 may advance to a maximum count of seven, no further changes occur at the output MSB of the counter 306 until the conclusion of the 20 minute interval at which time the timer 304 transmits a reset signal through the OR gate 310 to reset the counter 306 and thereby reconnect the terminal B with the interlock system 284.

Referring now to FIG. 6 there is seen an alternative embodiment of the generator 26 of FIGS. 1 and 3, identified by the legend 26A, which transforms (in a mathematical sense) the response of the person 30. The generator 26A comprises an integrator 320 having one or two stages of integration. In FIG. 6 there is seen the potentiometer 174, previously seen in FIG. 3, connecting to the knob 46 with the output of the potentiometer 174 being applied to the integrator 320. The output of the integrator 320 is coupled to the comparator 32 previously seen in FIGS. 1 and 3. The remaining portions of the system 20 and 20A are the same and, accordingly, are not seen in FIG. 6. The effect of a single stage of integration in the integrator 320, such as may be provided by an operational amplifier with capacitive feedback or an R-C circuit having a long time constant, is to provide the person 30 of FIG. 1 with a rate control. With a single stage of integration in the integrator 320, the hand motions of the person 30 must be equal to the derivative of those hand motions utilized in the absence of the indicator 320. And with two stages of integration, his hand motions must be equal to the second derivative of the motions utilized in the absence of the integrator 320. It may also be desirable to utilize a nonlinear network such as that provided by a diode in the vicinity of its break point, this being used in lieu of the integrator 320 or, in conjunction therewith, by summing together the response of the diode and the integrator with a summing circuit. By way of example, such a non-linear circuit 322 is shown in FIG. 6, the nonlinear circuit 322 comprising two diodes 324 and 326 which are interconnected by a resistor 328, and an amplifier 330. The anode electrode of the diode 324 is connected to the potentiometer 174. The cathode electrode of the diode 326 is connected to ground while the anode electrode of the diode 326 is connected to the amplifier 330 for amplifying the voltage appearing across the diode 326. A summing network 332 is provided for summing together the output voltage of the nonlinear circuit 322 and the integrator 320, with the output of the summing network 332 being applied to the comparator 32.

It is understood that the above-described embodiments of the invention are illustrative only and that modifications thereof will occur to those skilled in the art. Accordingly, it is desired that this invention is not to be limited to the embodiment disclosed herein but is to be limited only as defined by the appended claims.

What is claimed is:

1. A system for analyzing the reactions of a person comprising:
    means for providing a time dependent pattern relative to a preferred response of said person, at least a portion of said pattern representing a response having an amplitude which changes continually in a preferred direction, said pattern being hidden from said person;
    means coupled to said person for transmitting his response to said system;
    means for comparing said response to said pattern; and
    means for communicating to said person the comparison provided by said comparing means.

2. The system according to claim 1 further comprising means coupled to said comparing means for combining successive results of said comparisons.

3. The system according to claim 2 wherein said combining means integrates the results of said comparisons.

4. The system according to claim 3 further comprising means coupled to said combining means for determining when said integration signifies a failure on the part of said person to respond in accordance with said pattern.

5. The system according to claim 4 further comprising means coupled to said determining means for indicating said failure to said person.

6. The system according to claim 5 further comprising means for indicating to said person that he has successfully responded to said pattern, and wherein said determining means is coupled to said pattern providing means, said determining means energizing said success indicating means at a predetermined point of said pattern if there has been no signifying of said failure.

7. The system according to claim 6 wherein said communicating means elicits a sensory perception by said person, and said transmitting means comprises a handle operative by said person.

8. The system according to claim 7 wherein said pattern providing means comprises means operative by said person for restarting said pattern independently of the amount of said pattern which has already been provided by said pattern providing means.

9. The system according to claim 4 wherein said transmitting means includes means for transforming said response prior to said transmission thereof, said transforming means varying the amplitude of said response in a predetermined manner.

10. The system according to claim 9 wherein said transforming means comprises at least one integrator.

11. The system according to claim 9 wherein said transforming means includes means for varying the amplitude of said response in a nonlinear manner.

12. The system according to claim 4 further comprising means coupled to said determining means for interlocking the circuitry utilized in operating a vehicle.

13. The system according to claim 12 wherein said determining means includes means for signifying a success by said person in responding to said pattern.

14. The system according to claim 13 wherein said interlocking means comprises a relay having contacts connected to an ignition circuit of said vehicle.

15. The system according to claim 14 wherein said interlocking means comprises means for counting the number of said failures, said interlocking means having circuitry responsive to said signifying of success by said determining means for energizing said relay when the number of said failures in a succession of such failures is below a predetermined number.

16. The system according to claim 15 further comprising means for locking said relay in an energized position.

17. The system according to claim 16 wherein said relay locking means includes a timer for deactivating the locking circuit at the end of a predetermined time interval subsequent to the turning OFF of an ignition switch of said vehicle, said relay locking means having a circuit configured to permit the connection of said ignition switch therein, said relay locking means permitting energization of said relay by said ignition switch during said predetermined interval in the absence of a signal from said determining means.

18. The system according to claim 17 wherein said interlocking means comprises means for decoupling said determining means after a predetermined time interval subsequent to the beginning of said response by said person.

19. The system according to claim 18 further comprising a switching circuit for bypassing said contacts of said relay, said switching circuit being coupled to a warning indicator of said vehicle for energizing said indicator when said contacts are bypassed.

20. The system according to claim 1 wherein said pattern providing means comprises a staircase waveform generator and a filter coupled thereto.

21. The system according to claim 20 wherein said pattern providing means includes a random signal generator for driving said staircase waveform generator.

22. The system according to claim 21 wherein said staircase waveform generator comprises an UP/DOWN counter coupled to a digital-to-analog converter.

23. The system according to claim 22 wherein said random signal generator comprises a random number generator, a clock, a switching means and a counter, said clock driving said random number generator and said counter, said random number generator providing an address to said switching means for selecting an output of said counter, said switching means applying said selected output to said UP/DOWN counter.

24. The system according to claim 4 wherein said pattern providing means comprises a charging circuit, switching means for varying the rate of charging of said charging circuit, and a timer for operating said switching means.

25. The system according to claim 24 wherein said comparing means comprises a differential amplifier having a first input connected to said charging circuit and a second input connected to said response transmitting means.

26. The system according to claim 24 wherein said differential amplifier comprises a pair of coupled amplifier stages, said comparing means further comprising a pair of serially connected transistors each of which is coupled to a respective one of said amplifier stages, said serially connected transistors providing a signal indicating that the signal to one of said inputs of said differential amplifier is greater than the signal to the other of said inputs of said differential amplifier.

27. The system according to claim 24 wherein said determining means comprises a first and a second threshold detector connected respectively to said timer and to said combining means, and an AND gate connected in a logical arrangement wherein a signal from said first detector is passed by said AND gate in the absence of a signal from said second threshold detector for indicating that said person has succeeded in his response, a signal from said second threshold detector indicating a failure of said response while disabling said AND gate from passing the output signal of said first threshold detector.

28. In combination:
means adapted to be coupled to an organism for providing a response by said organism;
means for generating a pattern relative to a preferred response of said organism, at least a portion of said pattern representing a response having an amplitude which changes continually in a preferred direction, said pattern being hidden from said organism;
means for comparing said response to said pattern; and
means for communicating to said organism the comparison provided by said comparing means.

29. The combination according to claim 28 further comprising means for interlocking said communication means with a vehicle to be operated by said organism, said interlocking means preventing operation of said vehicle when said response compares poorly to said pattern.

* * * * *